Patented Aug. 31, 1954

2,688,011

UNITED STATES PATENT OFFICE 2,688,011

PRODUCTION OF POLYAMIDES CONTAINING A PARA-AMINO-BENZOIC ACID COMPONENT

Edward William Wheatley and James Wotherspoon Fisher, Spondon, near Derby, England, assignors to British Celanese Limited, a corporation of Great Britain No Drawing. Application March 13, 1952, Serial No. 276,442

Claims priority, application Great Britain March 16, 1951

8 Claims. (Cl. 260—78)

This invention relates to the production of polyamides and more particularly to the production of condensation interpolyamides.

Polyamides are generally produced by the condensation of diamines or their amide-forming derivatives with dicarboxylic acids or their amide-forming derivatives or by the condensation with themselves of amino-carboxylic acids or their amide-forming derivatives. Interpolyamides may be produced from a mixture of two or more diamines, aliphatic or aromatic, with one or more dicarboxylic acids, from a mixture of two or more dicarboxylic acids, aliphatic or aromatic, with one or more diamines, or from a mixture of a diamine and a dicarboxylic acid with an amino-carboxylic acid. Generally the result of using mixtures of diamines or mixtures of dicarboxylic acids or a mixture of a diamine and a dicarboxylic acid with an amino-carboxylic acid is to produce an interpolyamide which is of relatively low melting point and therefore of little or no use as a fibre-forming polymer for the production of filaments for general textile purposes. The combination in the polymer of different chain lengths due to the use of the different reagents generally reduces the melting point of the polymer to a value below the temperature at which domestic ironing is customarily carried out. In consequence, to produce filaments suitable for general textile purposes it has been the custom to use a single diamine and a single dicarboxylic acid.

We have found that valuable interpolymers may be produced from a polymethylene diamine, a polymethylene dicarboxylic acid and certain selected aromatic amino-carboxylic acids, the latter being used within certain proportions. Para-amino-benzoic acid is the most important aromatic amino-carboxylic acid for use according to the present invention.

If para-amino-benzoic acid be condensed with a poly-methylene diamine and a polymethylene dicarboxylic acid in a proportion of 5 to 25 molar percent of the para-amino-benzoic acid relative to the total moles of reagents in the reaction mixture, then interpolyamidese may be produced having relatively high melting points which render them capable of withstanding domestic ironing temperatures, say 200 to 220° C., and they can be spun into filaments by melt spinning processes without undue decomposition. Preferably the molar proportion of the aromatic amino-carboxylic acid is of the order of 5–15 or 20% relative to the total moles in the mixture. Thus, for example, in the condensation of hexamethylene diamine and adipic acid, 5–15 molar percent of para-amino-benzoic acid yields a polymer having a melting point of the order of 250° C., which is much higher than the generality of interpolymers.

As the diamines and dicarboxylic acids we may use for example tetramethylene diamine, pentamethylene diamine, hexamethylene diamine and decamethylene diamine on the one hand and glutaric acid, adipic acid, pimelic acid, suberic acid and sebacic acid on the other. Preferably a combination of polymethylene diamine and polymethylene dicarboxylic acid is used such that the combined carbon content of the two reagents does not exceed 14 carbon atoms. Preferably polymethylene diamines and polymethylene dicarboxylic acids which contain an even number of methylene groups are used.

To produce fibre-forming polymers the diamine and dicarboxylic acid should be used in substantially equimolar proportions, that is to say any excess of one over the other should not exceed about 2 molar percent and is preferably 1 molar percent or less.

Instead of using para-amino-benzoic acid we may use 4-amino-diphenyl-ether-4'-dicarboxylic acid or nuclear methyl derivatives of this acid or of para-amino-benzoic acid. Thus the aromatic amino-carboxylic acids used according to the present invention have the formula

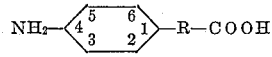

where R is a direct bond or is

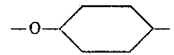

the 2-, 3-, 5- and 6-positions in the benzene nucleus or benzene nuclei being unsubstituted or substituted by methyl groups. Examples of such methyl-substituted aromatic amino acids are 4-amino-2-methyl-benzoic acid and 4-amino-2,6-dimethyl-benzoic acid.

The condensation to produce the interpolyamides may be carried out in the melt or in solution in a suitable solvent, for example phenolic compounds such as the cresols, xylenols, oxydiphenyls and the like. Instead of using compounds containing free amino groups and free carboxylic acid groups, amide-forming derivatives of such compounds may be used, for example formyl amino compounds, carboxylic ester compounds, for example methyl, phenyl or other esters, carboxylic amide compounds and mixed anhydrides of the carboxylic acids with volatile monocarboxylic acids. Further, instead of using amino compounds, the corresponding isocyano compounds can be used, though it is to be noted that in this case all the amines in the mixture, both in the diamine and in the amino-carboxylic acid, should be replaced by the corresponding isocyano compounds.

The following example illustrates the invention:

*Example*

9 parts by weight of hexamethylene diammonium adipate and 1 part by weight of para-amino-benzoic acid (i. e. about 4.7 moles of hexamethylene diamine, 4.7 moles of adipic acid and 1 mole of para-amino-benzoic acid, making a molar percentage of para-amino-benzoic acid of about 9.6) were well mixed and heated under nitrogen at 220° C. for ½ hour. At this stage the polymer resolidified to a pure white mass and the temperature was raised to 280° C. during ½ hour and maintained at that value for a further hour. The pressure was then reduced to an absolute pressure of 2 mms. of mercury and heating was continued at 280° C. for a further hour. At the end of this period the product was a light-coloured hard mass having a melting point of 248–250° C. It had very good fibre-forming properties and an intrinsic viscosity of 0.54, the intrinsic viscosity being the hyperbolic logarithm of the relative viscosity of a solution of the polymer in meta-cresol containing 1 gram of polymer to 100 ccs. of solution.

Similarly good fibre-forming polymers of high melting point are produced by replacing the hexamethylene diamine and adipic acid in the above example by an equal number of moles of tetramethylene diamine and pimelic acid on the one hand or tetramethylene diamine and suberic acid on the other and/or by replacing the para-amino-benzoic acid by an equimolar proportion of 4-amino-diphenyl-ether-4'-carboxylic acid or of 4-amino-2.6-dimethyl-benzoic acid.

While the above example uses the method of heating all the reagents for the polymer together, a preliminary condensation may first be carried out with some of the constituents and the remaining constituents then added. For example, the aliphatic diamine and aliphatic dicarboxylic acid may first be condensed together and the para-amino-benzoic acid or analogous compound then added and the condensation continued.

As already indicated, the condensations according to the present invention may be continued until the products have fibre-forming properties, and these products may then be melt spun into filaments which can be oriented by cold-drawing or drawing at an appropriate temperature below the melting point of the polymer, for example a temperature up to 80 or 100° C. The polymers may also be used for the production of films or lacquers with or without other lacquer or film forming bases.

Having described our invention, what we desire to secure by Letters Patent is:

1. Process for the production of interpolyamides of high melting point, which comprises condensing a substance selected from the group consisting of para-amino-benzoic acid and amide-forming derivatives thereof with a substance selected from the group consisting of diprimary polymethylene diamines and amide-forming derivatives thereof and a substance selected from the group consisting of polymethylene dicarboxylic acids and amide-forming derivatives thereof, the polymethylene diamine and polymethylene dicarboxylic acid each having an even number of methylene groups and together containing at the most 14 carbon atoms, the reagents being so proportioned that the polymethylene diamine and polymethylene dicarboxylic acid components are used in substantially equimolecular proportions and the para-amino-benzoic acid component constituting 5 to 25 molar per cent of the total moles of reagent used.

2. Process according to claim 1 wherein the condensation is continued until the polymer is fibre-forming.

3. Process for the production of interpolyamides of high melting point, which comprises condensing a substance selected from the group consisting of para-amino-benzoic acid and amide-forming derivatives thereof with a substance selected from the group consisting of diprimary polymethylene diamines and amide-forming derivatives thereof and a substance selected from the group consisting of polymethylene dicarboxylic acids and amide-forming derivatives thereof, the polymethylene diamine and polymethylene dicarboxylic acid each having an even number of methylene groups and together containing at the most 14 carbon atoms, the reagents being so proportioned that the polymethylene diamine and polymethylene dicarboxylic acid components are used in substantially equimolecular proportions and the para-amino-benzoic acid component constituting 5 to 15 molar per cent of the total moles of reagent used.

4. Process for the production of interpolyamides of high melting point, which comprises condensing a substance selected from the group consisting of para-amino-benzoic acid and amide-forming derivatives thereof with a susbtance selected from the group consisting of hexamethylene diamine and amide-forming derivatives thereof and a substance selected from the group consisting of adipic acid and amide-forming derivatives thereof, the reagents being so proportioned that the hexamethylene diamine and adipic acid components are in substantially equimolecular proportions and the para-amino-benzoic acid component constituting 5 to 15 molar per cent of the total moles of reagent used.

5. Process according to claim 4 wherein the condensation is continued until the polymer is fibre-forming.

6. An interpolyamide of high melting point which on hydrolysis yields para-amino-benzoic acid, a polymethylene diamine and a polymethylene dicarboxylic acid, the polymethylene diamine and polymethylene dicarboxylic acid each having an even number of methylene groups and together containing at the most 14 carbon atoms, the polymer having a substantially equimolar content of the polymethylene diamine and polymethylene dicarboxylic acid and a content of para-amino-benzoic acid equal to 5 to 25 molar per cent of its total constituent molecules.

7. A fibre-forming interpolyamide of high melting point which yields on hydrolysis a polymethylene diamine, a polymethylene dicarboxylic acid and para-amino-benzoic acid, the poly methylene diamine and polymethylene dicarboxylic acid each having an even number of methylene groups and together containing at most 14 carbon atoms, the polymer having a substantially equimolar content of the polymethylene diamine and polymethylene dicarboxylic acid and a content of para-amino-benzoic acid equal to 5 to 15 molar per cent of its total constituent moles.

8. A fibre-forming interpolyamide of high melting point which on hydrolysis yields hexamethylene diamine, adipic acid and para-amino-benzoic acid, the polymer having a substantially equimolar content of the hexamethylene diamine and adipic acid and a content of para-aminobenzoic acid equal to 5 to 15 molar per cent of its total constituent moles.

References Cited in the file of this patent

UNITED STATES PATENTS

| Number | Name | Date |
|---|---|---|
| 2,252,555 | Carothers | Aug. 12, 1941 |

OTHER REFERENCES

Ser. No. 323,512, Hagedorn (A. P. C.), published Apr. 20, 1943.

Tropp, Berichte, vol. 61 B, pp. 1431 to 1439, 1928.

Hill et al.: J. Polymer Science vol. 2, October 1948, pp. 609 and 619 to 621.